T. F. Kums,
Harvester Rake.
No. 2415.
33,449
Patented Oct. 1, 1861.
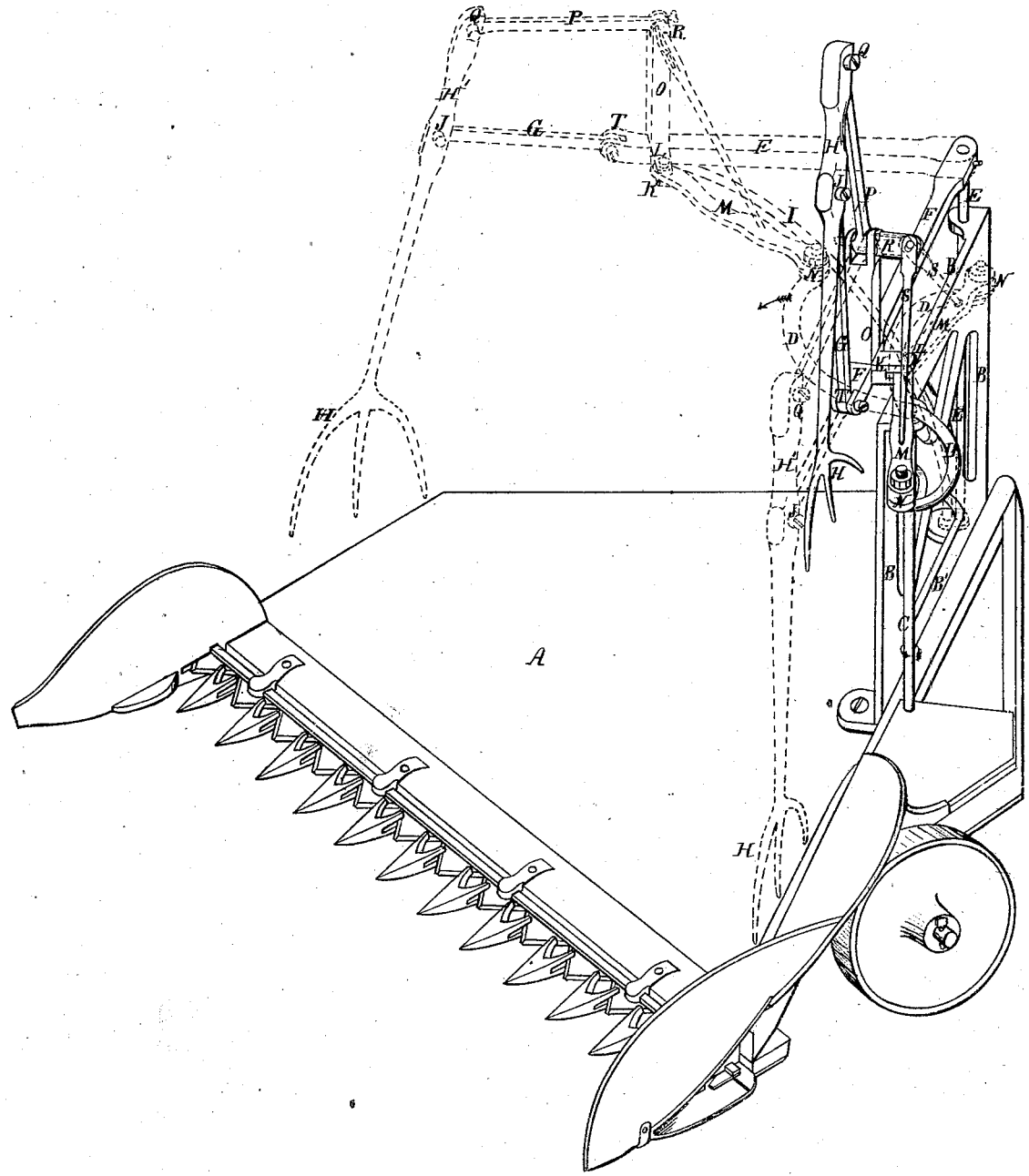

UNITED STATES PATENT OFFICE.

THEODORE F. KUMS, OF ROCKFORD, ILLINOIS, ASSIGNOR TO MARY MANNY, OF SAME PLACE.

IMPROVEMENT IN AUTOMATIC RAKES FOR HARVESTERS.

Specification forming part of Letters Patent No. 33,419, dated October 1, 1861.

*To all whom it may concern:*

Be it known that I, THEODORE F. KUMS, of Rockford, in the county of Winnebago and State of Illinois, have invented certain new and useful Improvements in Automatic Rakes for Harvesting-Machines, of which the following is a full, clear, and exact description, reference being had to the accompanying drawing, making part of this specification, which drawing represents a perspective view of the platform and cutting apparatus of a reaping-machine with my improved raking mechanism attached.

The position of the raking mechanism when the rake is about to descend to the platform to seize upon the grain is shown in black lines. In red lines is shown the position of the raking mechanism when the rake has descended to the platform behind the cutting apparatus, and is in readiness to move across the platform to sweep off the cut grain. When the grain has been removed from the platform, and the rake is about to be raised and to return across the platform, the mechanism assumes the position shown in blue lines in the drawing.

The raking apparatus is arranged upon the rear and outer corner of the platform A, and is supported by a frame-work, B, erected upon the frame of the reaper. At the end of this frame-work nearest the cutter and divider is arranged a vertical shaft, C, supported in suitable bearings, and carrying upon its upper end a horizontal arm, D. This shaft and arm are caused to rotate by means of gearing from the driving-wheel of the machine.

A bevel-wheel may be arranged upon the lower end of the shaft C, to gear with a bevel-pinion upon a horizontal shaft receiving motion from the driving-wheel, or any other convenient arrangement of gearing may be adopted.

The arm D, I prefer to make of a curved form, as shown.

At the rear end of the frame B is arranged a second vertical shaft, E, stepped into the frame of the machine, and occupying nearly the usual position of the forker's stand upon the Manny reaper. This shaft also carries upon its upper end a horizontal arm, F, which carries the rake H. A brace, I, is arranged between the arm F and the shaft E, in order to give greater strength and steadiness to the raking mechanism.

The link G is pivoted at one end, T, to the end of the arm F, and at the other end, J, to the rake-handle H', a short distance from its upper end, and the link and rake are free to vibrate vertically upon their respective pivots T and J.

A horizontal vibratory motion is given to the rake H, the link G, and arm F, as follows: A stud, K, projects from the side of the arm F, and to it at L is pivoted one end of a link, M, whose other end is jointed at N to the rotating arm D. Thus it will be seen that as the shaft C rotates the end of the link M, which is pivoted at N, will follow the motions of the arm D, and as the arm F is free to vibrate upon its supporting-shaft E, it will be caused to vibrate horizontally with each complete rotation of the shaft C and arm D, causing the rake to traverse the platform in the arc of a circle.

The raising of the rake in order to return it over the platform, out of the way of the falling grain, I effect as follows: From near the front end of the arm F rises a standard, O, at whose upper end is jointed an arm, P, pivoted at Q to the upper end of the rake-handle H', and free to turn vertically as the pin R rocks in its bearings. This pin R is firmly attached to the arm P, and forms the pivot upon which the arm works, turning in its bearings in the standard O. The end of this pin projects laterally from the standard, is flattened, as shown, and is embraced by the forked end of a diagonal link, S, which is pivoted to the pin at a point perpendicularly above the pivot L of the link M, and whose lower end is free to partially rotate in a socket in the connecting-link M. As the arm D rotates the link M changes its angular position with regard to the rake-arm F. The lower end of the diagonal link S, moving with it, is caused to vibrate back and forth, and at the proper times to perform a half-rotation upon its axis, thus turning the pin R in its bearings, by which the outer end of the arm P (and with it the rake H) is raised and lowered.

The operation of my improved rake is as follows: In the drawing the rake is shown in red lines in position ready to sweep off the gavel. The shaft C rotates in the direction shown by the arrow, and the rotation of the arm D, by means of the connecting-link M, throws the horizontal arm F away from the frame B, and turning upon the vertical shaft E, it carries the rake across the platform, beneath the reel, to sweep off the grain lying behind the cutters. The inclination of the rake-handle, caused by the arrangement of the arms and joints by which it is connected with the arm F, allows of its moving across the platform without interfering with the action of the reel. When the gavel has been discharged, the raking mechanism assumes the position shown by blue lines in the drawing. About a quarter-revolution of the shaft C effects this result. As it continues to revolve the arm F is pulled back, while, by reason of the change in the position of the link M, the diagonal link S performs a partial revolution upon its axis and turns the pin R in its bearings, which raises the end of the arm P, and with it the rake, which latter is caused to recede from the cutters as it rises from the platform, and, as it were, fold up out of the way of the reel. Thus by about another quarter-revolution of the shaft C the rake is raised and returned over the platform until it assumes the position shown by black lines in the drawing. The pivot L of link M and the shaft C are now nearly in line with each other Consequently the arm F will have but little motion as the shaft continues to revolve, and the rake will therefore have very little horizontal motion while descending to the platform. As the shaft C, however, turns through the remaining half of its revolution, the lower end of the diagonal link S is carried back by the arm D, and at the same time it partially rotates upon its axes in the reverse direction from that of its former rotation, and thus turns the pin R and lowers the rake to the platform, the respective parts assuming the position shown in red lines, and the rake is in readiness to sweep another gavel from the platform.

Having thus described the construction and operation of my improved automatic rake for harvesters, what I claim therein as new, and desire to secure by Letters Patent, is—

The raking mechanism, constructed and operating substantially as described.

In testimony whereof I have hereunto subscribed my name.

T. F. KUMS.

Witnesses:
 ROB. H. TINKER,
 WM. A. KNOWLTON.